United States Patent [19]
Yanus et al.

[11] Patent Number: 6,107,439
[45] Date of Patent: Aug. 22, 2000

[54] CROSS LINKED CONDUCTING COMPOSITIONS

[75] Inventors: John F. Yanus, Webster; Damodar M. Pai, Fairport; Timothy J. Fuller, Pittsford; Paul J. DeFeo, Sodus Point; Markus R. Silvestri, Fairport; Dale S. Renfer, Webster; William W. Limburg, Penfield, all of N.Y.

[73] Assignee: Xerox Corporation, Stamford, Conn.

[21] Appl. No.: 09/218,409

[22] Filed: Dec. 22, 1998

[51] Int. Cl.⁷ .......................... C08G 75/00; G03G 15/00; H01B 1/00; B05D 3/02
[52] U.S. Cl. .......................... 528/170; 528/173; 528/310; 528/322; 528/332; 528/172; 430/56; 430/62; 430/73; 430/74; 430/75; 430/80; 427/58; 427/385.5; 252/500; 252/510; 252/511
[58] Field of Search .................................. 430/62, 56, 80, 430/73, 74, 75; 427/58, 385.5; 528/172, 173, 170, 310, 322, 332; 252/500, 510, 511

[56] References Cited

U.S. PATENT DOCUMENTS

| | | | |
|---|---|---|---|
| 4,338,222 | 7/1982 | Limburg et al. | 252/500 |
| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,871,634 | 10/1989 | Limburg et al. | 430/54 |
| 4,956,440 | 9/1990 | Limburg et al. | 528/99 |
| 5,155,200 | 10/1992 | Limburg et al. | 528/67 |
| 5,300,339 | 4/1994 | Hays et al. | 428/36.9 |
| 5,342,719 | 8/1994 | Pai et al. | 430/59 |
| 5,368,967 | 11/1994 | Schank et al. | 430/59 |
| 5,386,277 | 1/1995 | Hays et al. | 355/259 |
| 5,549,851 | 8/1996 | Fukushima et al. | 252/519 |
| 5,587,224 | 12/1996 | Hsieh et al. | 428/195 |
| 5,681,679 | 10/1997 | Schank et al. | 430/59 |
| 5,702,854 | 12/1997 | Schank et al. | 430/59 |
| 5,709,974 | 1/1998 | Yuh et al. | 430/59 |
| 5,739,254 | 4/1998 | Fuller et al. | 528/125 |
| 5,853,906 | 12/1998 | Hsieh | 428/690 |
| 5,976,418 | 11/1999 | Fuller et al. | 252/500 |
| 5,976,744 | 11/1999 | Fuller et al. | 430/66 |

*Primary Examiner*—P. Hampton-Hightower

[57] ABSTRACT

A conductive composition including a mixture of a reaction product of a hole transporting hydroxy functionalized aryl amine, a hydroxy functionalized arylamine that is different from the hole transporting hydroxy functionalized aryl amine, a cross linkable polyamide, and and an acid capable of simultaneously cross linking the polyamide and oxidizing a portion of the hydroxy functionalized arylamine, the mixture of a reaction product including a hole transporting hydroxy functionalized aryl amine and an oxidized hydroxy functionalized aryl amine in a a crosslinked polyamide matrix.

Other embodiments including processes for applying the aforementioned composition and processes for using devices containing the compositions in high speed laser printing and related printing systems are also disclosed.

20 Claims, No Drawings

CROSS LINKED CONDUCTING COMPOSITIONS

BACKGROUND OF THE INVENTION

The present invention relates in general to electrically conductive coating compositions and more specifically to tunable conductivity coating compositions. These compositions may be employed in many applications including, for example, electrophotographic image development systems.

Electrophotographic image development systems such as liquid image development systems, scavengeless development systems and hybrid scavengeless development systems are well known in the art of electrophotography. Scavengeless development systems do not scavenge or interact with a previously toned image and thereby do not negatively affect image quality and are important in trilevel and highlight color xerography, reference for example, U.S. Pat. No. 4,078,929.

Two-phase conductive compositions are also known and contain, for example, dispersions of conductive particles, such as carbon black or graphite, in an insulating polymer matrix, for example, dielectric binders such as a phenolic resin or fluoropolymer. The conductive pigment loading concentration of two-phase conductive compositions are near the percolation threshold concentration. Conductive particle concentration levels at or near the percolation limit allow for conductive particle contact, resulting in a burst of conductivity, reference for example, U.S. Pat. No. 4,505,573, to Brewington et al. The dielectric constant of conductive coatings and overcoatings typically can be from about 3 to about 5, and preferably about 3. The desired conductivity is achieved by controlling the loading of the conductive particles. However, the low conductivity values required for electrophotographic image development systems and the large, intrinsic electrical conductivity of carbon black make it extremely difficult to achieve predictable and reproducible conductivity values. Very small changes in the loading of conductive particles near the percolation threshold can cause dramatic changes in the conductivity of a coating. Furthermore, even at a constant weight loading, differences in particle size and shape can cause wide variations in conductivity. Moreover, the percolation threshold approach to obtaining conductive coatings requires relatively high concentrations of conductive particles. At these concentrations, the coatings typically become brittle, and the mechanical properties of the coating are controlled by carbon black content rather than by the polymer matrix.

Another approach is to molecularly dope a polymer matrix with mixtures of a neutral charge transport molecule and its radical cation or anion. "Molecular doping" refers to the relatively low amounts of dopant added, compared to the aforementioned high loading concentrations of carbon black dispersions, to increase the conductivity of a polymer matrix. The resulting molecularly doped mixture is essentially a solid solution. No chemical bonding occurs between the dopant and the charge transport molecule so as to produce a new material or alloy. The doped polymer provides stable and controlled conductivity arising from molecular doping with dopants such as oxidizing agents. In the presence of an oxidizing dopant, partially oxidized charge transport moieties in the charge-transporting polymer act as hole carrier sites, which transport positive charges or "holes" through the unoxidized charge transport molecules. For example, Mort et al., *J. Electronic Materials*, 9:41 (1980), disclose the possibility of chemically controlling dark conductivity by co-doping a polycarbonate with neutral and oxidized species of the same molecule, tri-p-tolylamine (TTA), that is TTA, and TTA$^+$ respectively, where TTA$^+$ represents a cation radical salt of TTA. Limburg et al., in U.S. Pat. No. 4,338,222, disclose an electrically conducting, three-component composition comprising: a polymer matrix; an organic hole transport compound, particularly tetraaryl biphenyl diamines, and oxidized species of the same molecule, which is the reaction product of the organic hole transport compound and an oxidizing agent capable of accepting one electron from the hole transport compound. Hays et al., in U.S. Pat. No. 5,300,339 and U.S. Pat. No. 5,448,342, disclose an overcoating comprising at least three constituents: a charge transport compound, for example, especially an aryl diamine, a polymer binder, especially a polycarbonate or a polyethercarbonate, and an oxidizing agent. Hays et al., in U.S. Pat. No. 5,386,277, further disclose an overcoating comprising two constituents: a charge transport polymer with tetraaryl biphenyldiamine units in the main chain and an oxidant.

INFORMATION DISCLOSURE STATEMENT

U.S. Pat. No. 4,338,222 to Limburg et al., issued Jul. 6, 1982—An electrically conducting composition is disclosed comprising an organic hole transporting compound and the reaction product of an organic hole transporting compound and an oxidizing agent capable of accepting one electron from the hole transporting compound. This composition can have three-components including a polymer matrix; an organic hole transport compound, particularly tetraaryl biphenyldiamines, and oxidized species of the same molecule, which is the reaction product of the organic hole transport compound and an oxidizing agent capable of accepting one electron from the hole transport compound.

U.S. Pat. No. 4,806,443 to Limburg et al., issued Feb. 21, 1989—An electrostatographic imaging member is disclosed in which the imaging member comprises a substrate and an electroconductive layer, the imaging member comprising a polymeric arylamine compound. The polymeric arylamine compound is a reaction product of a specific glycol chloroformate and a specific dihydroxy arylamine compound.

U.S. Pat. No. 4,806,444 to Yanus et al., issued Feb. 21, 1989—An electrostatographic imaging member is disclosed in which the imaging member comprises a substrate and an electroconductive layer, the imaging member comprising a specific polymeric arylamine compound represented by a formula.

U.S. Pat. No. 4,801,517 to Frechet et al., issued Jan. 31, 1989—An electrostatographic imaging member is disclosed in which the imaging member comprises a substrate and an electroconductive layer, the imaging member comprising a specific polymeric arylamine compound represented by a formula.

U.S. Pat. No. 5,300,339 to Hays et al., issued Apr. 5, 1994—A coated toner transport roll is disclosed containing a core with a coating thereover of transporting molecules dispersed in a binder and an oxidizing agent selected from the group consisting of ferric chloride and trifluoroacetic acid. These oxidizing agents can be selected in an amount of from about 1 to about 50 weight percent. Also, the coating possesses a relaxation time of from about 0.0099 millisecond to about 3.5 milliseconds, and a residual voltage of from about 1 to about 10 volts.

U.S. Pat. No. 5,386,277 to Hays et al. issued Jan. 31, 1995—An apparatus is disclosed for developing a latent image that contains a housing with a supply of a developer of carrier and toner and a coated toner donor member, which member is spaced from the surface on which a latent image is being recorded. The apparatus also includes a means for advancing the developer material in the chamber of the housing and this means cooperates with the donor means and both means define a region wherein a substantially constant quantity of toner is deposited on the donor member. The apparatus further includes an electrode means positioned near the surface of a dielectric core roll and these electrodes are biased to detach toner from the donor member and to form a donor cloud for developing the latent image. The coated toner transport means can be comprised of a core with a coating of an oxidized polyether carbonate, e.g. a charge transport polymer with tetraaryl diamine units in the main chain and an oxidant.

U.S. Pat. No. 5,739,254 to Crandall et al., issued on Apr. 14, 1998 and U.S. Pat. No. 5,753,783 to Crandall et al., issued on May 19, 1998—A process is disclosed which comprises reacting a polymer of the general formula

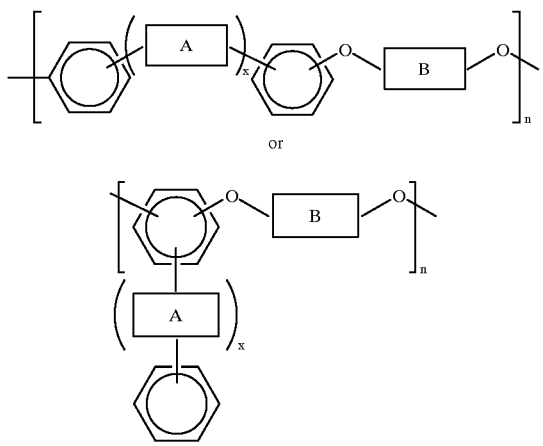

wherein x is an integer of 0 or 1, A is one of several specified groups, such as

B is one of several specified groups, such as

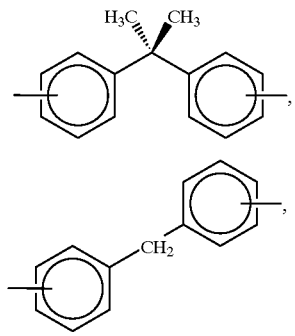

-continued

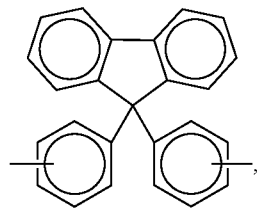

or mixtures thereof, and n is an integer representing the number of repeating monomer units, with an acetyl halide and dimethoxymethane in the presence of a halogen-containing Lewis acid catalyst and methanol, thereby forming a haloalkylated polymer. In a specific embodiment, the haloalkylated polymer is then reacted further to replace at least some of the haloalkyl groups with photosensitivity-imparting groups. Also disclosed is a process for preparing a thermal ink jet printhead with the aforementioned polymer.

U.S. Pat. No. 5,549,851, to Fukushima et al., issued Aug. 27, 1996—Disclosed is silicon containing polymer such as a polysilane, poly(disilanylenephenylene), and poly (disilanyleneethynylene) is admixed with an amine compound and then doped with an oxidizing dopant, typically iodine and ferric chloride, to produce a highly conductive polymer composition having improved shapability. The composition is easily applicable, as by spin coating, to form a highly conductive film or coating. The conductive coating can have three constituents: an aryl amine charge transport molecule, polysilane binder, and an oxidant. However, it is known that polysilane binders decompose upon light exposure. It is also particularly difficult to prepare thick coating films of polysilanes, for example, about 30 micron. Representative coatings were found to be unstable electrically and mechanically under ambient condition, for example, ferric chloride doped coatings were very brittle with unstable conductivity.

U.S. Pat. No. 5,587,224, to Hsieh et al., issued Dec. 24, 1996—A coated donor roll is disclosed comprised of a core with a coating thereover comprised of a photolysis reaction product of a charge transporting polymer and a photo acid compound. Included in the disclosure is the use of photoacids as photooxidants for overcoating with two or three constituents.

U.S. Pat. No. 4,871,634 to W. Limburg et. al., issued Oct. 3, 1989—A hydroxylarylamine compound, represented by a specific formula, is disclosed as employable in photoreceptors. The hydroxyarylamine compound can be used as an overcoating with hydroxyarylamine compound bonded to a resin capable of hydrogen bonding such as a polyamide possessing alcohol solubility.

U.S. Pat. No. 5,368,967 to R. Schank et. al., Nov. 29, 1994—An overcoat layer is disclosed comprising a small molecule hole transporting arylamine having at least two hydroxy functional groups, a hydroxy or multihydroxy triphenyl methane and a polyamide film forming binder capable of forming hydrogen bonds with the hydroxy functional groups of the hydroxy functionalized aromatic diamine and hydroxy or multihydroxy triphenyl methane.

U.S. Pat. No. 5,681,679 to R. Schank et. al.,—A flexible electrophotographic imaging member including a supporting substrate and a resilient combination of at least one photoconductive layer comprising a hole transporting arylamine siloxane polymer and an overcoating comprising a cross linked polyamide doped with hydroxy functionalized aromatic diamine.

U.S. Pat. No. 5,709,974 to H. Yuh et. al.,—An electrophotographic imaging member comprising a supporting substrate, a charge generator layer, a charge transport layer comprising a charge transporting molecule in a polystyrene matrix and said overcoating layer comprising a compound of hydroxy functionalized aromatic diamine having at least two hydroxy functional groups and a polyamide film forming binder capable of forming hydrogen bonds with said hydroxy functional groups of said hydroxy functionalized aromatic diamine.

U.S. Pat. No. 5,702,854 to Shank et al.—An electrophotographic imaging member including a supporting substrate with a charge generator layer, a charge transport layer and an overcoating layer comprising a hydroxy functionalized aromatic diamine dissolved or molecularly dispersed in a crosslinked polyamide matrix.

CROSS REFERENCE TO COPENDING APPLICATIONS

This application is related to the following U.S. patent applications:

U.S. patent application Ser. No. 08/950,303 filed in the names of Hsieh et al. on Oct. 14, 1998, now issued as U.S. Pat. No. 5,853,906 on Dec. 29, 1998—A conductive coating is disclosed comprising an oxidized oligomer salt, a charge transport component, and a polymer binder, for example, a conductive coating comprising an oxidized tetratolyldiamine salt of the formula

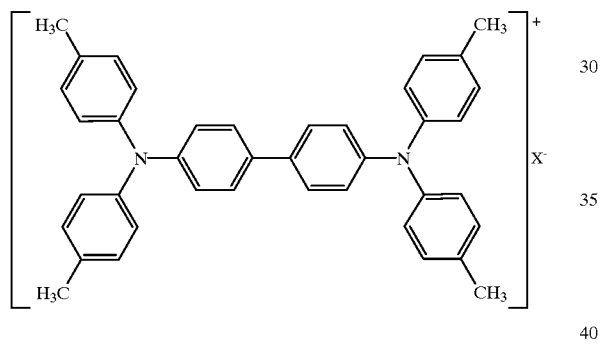

a charge transport component, and a polymer binder, wherein $X^-$ is a monovalent anion.

U.S. patent application Ser. No. 09/186,542, filed in the names of Fuller et al., entitled "Novel Conducting Compositions" mailed via Express Mail on Nov. 5, 1998, now issued as U.S. Pat. No. 5,976,418 on Nov. 2, 1999—A conductive coating composition selected from the group consisting of a first composition including
  a polymer containing halomethylated aromatic groups and
  a charge transporting material selected from the group consisting of
    at least one charge transport monomer containing arylamine groups,
    at least one charge transport polymer containing arylamine units in the main polymer chain,
    and mixtures of thereof,
a second composition including
  at least one monomer containing a halomethylated aromatic group,
  at least one charge transport monomer containing arylamine groups and
  a polymer binder, and
a third composition including
  at least one monomer containing a halomethylated aromatic group and
  at least one charge transport polymer with arylamine units in the main polymer chain.

U.S. patent application Ser. No. 09/182,602, filed in the names of John F. Yanus et al, entitled "OVERCOATING COMPOSITIONS, OVERCOATED PHOTORECEPTORS, AND METHODS OF FABRICATING AND USING OVERCOATED PHOTORECEPTORS", mailed via Express Mail on Oct. 29, 1998, pending (Attorney Docket No. D/97676)—An electrophotographic imaging member is disclosed including a supporting substrate coated with at least photoconductive layer, a charge transport layer and an overcoating layer, the overcoating layer including
  a hydroxy functionalized aromatic diamine and
  a hydroxy functionalized triarylamine dissolved or molecularly dispersed in a crosslinked polyamide matrix, the crosslinked polyamide prior to crosslinking being selected from the group consisting of materials represented by the following Formulae I and II:

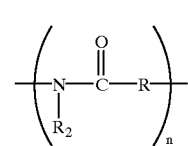

wherein:
  n is a positive integer sufficient to achieve a weight average molecular weight between about 5000 and about 100,000,
  R is an alkylene unit containing from 1 to 10 carbon atoms,
  between 1 and 99 percent of the $R_2$ sites are —H, and
  the remainder of the $R_2$ sites are —$CH_2$—O—$CH_3$, and

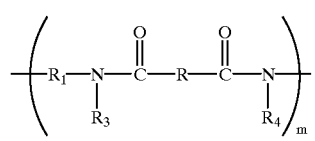

wherein:
  m is a positive integer sufficient to achieve a weight average molecular weight between about 5000 and about 100000,
  $R_1$, and R are independently selected from the group consisting of alkylene units containing from 1 to 10 carbon atoms, and
  between 1 and 99 percent of the $R_3$ and $R_4$ sites are —H, and
  the remainder of the $R_3$ and $R_4$ sites are —$CH_2$—O—$CH_3$.

Coating compositions for the overcoating layer of this invention as well as methods of making and using the overcoated photoreceptor are also disclosed.

U.S. patent application Ser. No. 09/182,375, filed in the names of Timothy J. Fuller et al., entitled "PHOTORECEPTOR OVERCOATINGS CONTAINING HYDROXY FUNCTIONALIZE AROMATIC DIAMINE, HYDROXY FUNCTIONALIZED TRIARYLAMINE AND CROSSLINKED ACRYLATED POLYAMIDE", mailed via Express Mail on Oct. 29, 1998, now issued as U.S. Pat. No. 5,976,744 on Nov. 2, 1999 (Attorney Docket No. D/98344)—An electrophotographic imaging member including a supporting substrate coated with at least one photoconductive layer, and an overcoating layer, the overcoating layer including a
a hydroxy functionalized aromatic diamine and
a hydroxy functionalized triarylamine dissolved or molecularly dispersed in a crosslinked acrylated polyamide matrix, the hydroxy functionalized triarylamine being a compound different from the polyhydroxy functionalized aromatic diamine, the crosslinked polyamide prior to crosslinking being selected from the group consisting of materials represented by the following Formulae I and II:

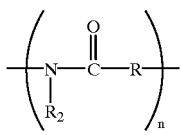
I wherein:
n is a positive integer sufficient to achieve a weight average molecular weight between about 5000 and about 100,000, R is an alkylene group containing from 1 to 10 carbon atoms, between 1 and 99 percent of the $R_2$ sites are

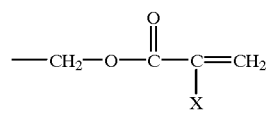

wherein
X is selected from the group consisting of —H (acrylate), —CH$_3$(methacrylate), alkyl and aryl, and
the remainder of the $R_2$ sites are selected from the group consisting of —H, —CH$_2$OCH$_3$, and —CH$_2$OH, and

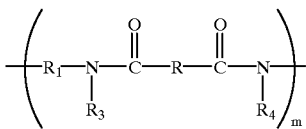
II wherein:
m is a positive integer sufficient to achieve a weight average molecular weight between about 5000 and about 100000, R and $R_1$ are independently selected from the group consisting of alkylene units containing from 1 to 10 carbon atoms;

between 1 and 99 percent of $R_3$ and $R_4$ are independently selected from the group consisting of

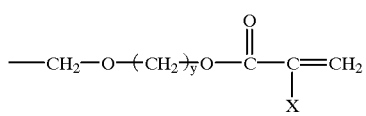

wherein
X is selected from the group consisting of hydrogen, alkyl, aryl and alkylaryl, wherein the alkyl groups contain 1 to 10 carbon atoms and the aryl groups contain 1 to 3 alkyl groups, y is an integer between 1 and 10, and the remainder of the $R_3$ and $R_4$ groups are selected from the group consisting of —H, —CH$_2$OH, —CH$_2$OCH$_3$, and —CH$_2$OC(O)—C(X)=CH$_2$.

The overcoating layer is formed by coating. The electrophotographic imaging member may be imaged in a process.

The entire disclosures of each of the aforementioned patents and the pending applications are incorporated herein by reference.

Thus, there continues to be a need for novel methods of creating conductive compositions.

There also continues to be a need for conductive polymeric compositions and processes which provide coatings with wide range of stable and controlled conductivity.

There further remains a need for conductive polymeric compositions which are homogeneous and pinhole free.

There also remains a need for tough, wear resistant cross linked polymeric conductive compositions.

There also remains a need for conductive polymeric compositions which are suitable for use in high speed printing systems.

Also, there has been sought an inexpensive, efficient and environmentally efficacious means for producing conductive polymeric compositions.

These needs and others solutions to the aforementioned problems are provided for in embodiments of the present invention and as illustrated herein.

SUMMARY OF THE INVENTION

It is, therefore, an object of the present invention to provide improved compositions with improved conductivity and stability properties which overcome the above-noted disadvantages.

It is another object of the present invention to provide improved compositions for overcoming, or minimizing deficiencies of prior art compositions and processes, by providing compositions with improved conductivity and stability properties.

It is still another object of the present invention to provide conductive coatings with stable conductivity under a wide range of environmental conditions.

It is yet object of the present invention to provide conductive coatings with controlled and reproducible conductivity in the range of 1 S/cm to $10^{-12}$ S/cm.

It is another object of the present invention to provide homogeneous conductive coatings with controlled conductivity that is not limited by percolation.

It is still another object of the present invention to provide a simple manufacturing process for the conductive coatings.

It is yet object of the present invention to provide a process with broad manufacturing latitude, such as compatibility with a wide range of solvents and polymer binders.

It is another object of the present invention to provide pinhole free conductive coatings with high dielectric strength.

It is still another object of the present invention to provide conductive coatings with high mechanical stability and wear resistance.

It is yet object of the present invention to provide conductive coatings with low surface energy.

It is another object of the present invention to provide conductive coatings that can protect metal substrates from oxidation or corrosion.

It is still another object of the present invention to provide conductive coatings with controlled conductivity for numerous semiconductor device applications.

It is yet another object of the present invention to provide cross linked conductive coatings with controlled conductivity for applications requiring low wear.

The foregoing and others are accomplished in accordance with the present invention by providing a conductive composition comprising a mixture of a reaction product of a hole transporting hydroxy functionalized aryl amine, a cross linkable polyamide, and and an acid capable of simultaneously cross linking the polyamide and oxidizing a portion of the hydroxy functionalized arylamine, the mixture of a reaction product comprising a hole transporting hydroxy functionalized aryl amine and an oxidized hydroxy functionalized aryl amine in a crosslinked polyamide matrix.

Still other embodiments of the present invention include processes for applying the aforementioned compositions and processes for using devices containing the compositions in high speed laser printing and related printing systems. The conductive polymeric compositions and processes of making and using the conductive polymeric compositions of the present invention provide improved stability and a broad range of conductivities, manufacturing and compositional latitude, low wear in applications requiring frictional contact and cleaning, and dielectric strength.

The conductive polymeric coating compositions of the present invention have controllable, reproducible, and stable electrical conductivity after curing. This conductivity can for example, be in the range of between about 1 to about $10^{-12}$ S/cm or (ohm-cm)$^{-1}$. Coating compositions of the present invention with an electrical conductivity in the range of $10^{-8}$ to $10^{-10}$ S/cm are useful anti-static materials or charge relaxation materials which have application, for example, in electrophotographic image development systems such as liquid image development systems or scavengeless and hybrid scavengeless development systems. Coating compositions of the present invention having electrical conductivities in the range of about 1 to about $10^{-10}$ S/cm are also useful in various applications such as: thin film transistor devices, see Dodabalapur et al., U.S. Pat. No. 5,574,291, and Tsumura; A. et al., U.S. Pat. No. 5,500,537; in electroluminescent devices, EP 686662-A2, U.S. Pat. No. 5,514,878 and U.S. Pat. No. 5,609,970, and A. J. Heeger, "Self-assembled Networks of Conducting polyaniline" in Trends in Polymer Science, 3, 39–47, 1995); in liquid crystal displays, U.S. Pat. No. 5,619,357 and U.S. Pat. No. 5,498,762; in electrochromic devices, U.S. Pat. No. 5,500,759, and U.S. Pat. No. 5,413,739; in photochromic devices, U.S. Pat. No. 5,604,626; in rechargeable batteries, U.S. Pat. No. 4,987,042 and U.S. Pat. No. 4,959,430; in secondary cells, U.S. Pat. No. 5,462,566 and U.S. Pat. No. 5,460,905; in electrochemical capacitors, U.S. Pat. No. 5,527,640, U.S. Pat. No. 4,910,645, U.S. Pat. No. 5,442,197 and U.S. Pat. No. 5,626,729; in photovoltaic cells, U.S. Pat. No. 5,482,570; in photodetectors, U.S. Pat. No. 5,523,555; in photosensitive imaging member, U.S. Pat. No. 5,616,440 and U.S. Pat. No. 5,389,477; in photographic coatings, U.S. Pat. No. 5,443,944; in formation of conductive polymer patterns, U.S. Pat. No. 5,561,030; in electroplating, U.S. Pat. No. 5,415,762, U.S. Pat. No. 5,575,898 and U.S. Pat. No. 5,403,467; in laser applications, Katulin, V. A. et al., Sov. J. Quantum Electron., 14, 74–77 (1984), Hide et al., Science 273, 1833, (1996); and Tessler, et al., Nature, 382, 695 (1996); in polymer grid triodes, U.S. Pat. No. 5,563,424; in anticorrosion coatings, U.S. Pat. No. 5,532,025 and U.S. Pat. No. 5,441,772; in ferromagnetic or high magnetic spin coatings, Shiomi et al., Synthetic Metals, 85, 1721–1722 (1997), and references cited therein.

Among various embodiments of the present invention, a composition is provided for use as conductive coatings comprising a mixture of a hole transporting hydroxy functionalized aryl amine and oxidized hydroxy functionalized aryl amine dispersed in a crosslinked polyamide matrix.

Any suitable insulating film forming alcohol soluble cross linkable polyamide polymer having methoxy methyl groups attached to the nitrogen atoms of amide groups in the polymer backbone prior to crosslinking may be employed in the overcoating of this invention. A preferred alcohol soluble polyamide polymer having methoxy methyl groups attached to the nitrogen atoms of amide groups in the polymer backbone prior to crosslinking is selected from the group consisting of materials represented by the following formulae I and II:

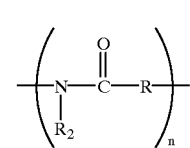

wherein:

n is a positive integer sufficient to achieve a weight average molecular weight between about 5000 and about 100,000, R is independently selected from the group consisting of alkylene, arylene or alkarylene units having from 1 to 10 carbon atoms, between 1 and 99 percent of the $R_2$ sites are —H, and the remainder of the $R_2$ sites are —CH$_2$—O—CH$_3$ and

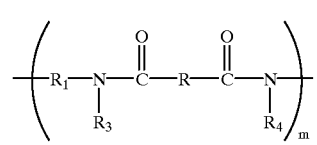

wherein:

m is a positive integer sufficient to achieve a weight average molecular weight between about 5000 and about 100000, $R_1$ and R are independently selected from the group consisting of alkylene, arylene or alkarylene units having from 1 to 10 carbon atoms, between 1 and 99 percent of the $R_3$ and $R_4$ sites are —H, and the remainder of the $R_3$ and $R_4$ sites are —CH$_2$—O—CH$_3$.

Between about 1 percent and about 50 mole percent of the total number of repeat units of the polyamide polymer should contain methoxy methyl groups attached to the nitrogen atoms of amide groups. These polyamides should form solid films if dried prior to cross linking. The polyamide should also be soluble, prior to cross linking, in the alcohol solvents employed.

A preferred polyamide is represented by the following formula:

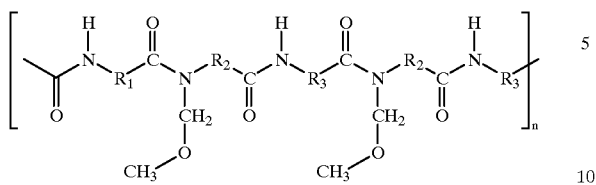

wherein
$R_1$, $R_2$ and $R_3$ are alkylene groups independently selected from units containing from 1 to 10 carbon atoms and
n is a positive integer sufficient to achieve a weight average molecular weight between about 5000 and about 100,000.

Typical alcohols in which the polyamide is soluble prior to cross linking include, for example, butanol, ethanol, methanol, and the like. Typical alcohol soluble polyamide polymers having methoxy methyl groups attached to the nitrogen atoms of amide groups in the polymer backbone prior to cross linking include, for example, hole insulating alcohol soluble polyamide film forming polymers include, for example, Luckamide 5003 from Dai Nippon Ink, Nylon 8 with methylmethoxy pendant groups, CM4000 from Toray Industries, Ltd. and CM8000 from Toray Industries, Ltd. and other N-methoxymethylated polyamides, such as those prepared according to the method described in Sorenson and Campbell "Preparative Methods of Polymer Chemistry" second edition, pg. 76, John Wiley & Sons Inc. 1968, and the like and mixtures thereof. These polyamides can be alcohol soluble, for example, with polar functional groups, such as methoxy, ethoxy and hydroxy groups, pendant from the polymer backbone. It should be noted that polyamides, such as Elvamides from DuPont de Nemours & Co., do not contain methoxy methyl groups attached to the nitrogen atoms of amide groups in the polymer backbone.

The tunable conducting films of this invention also contain hydroxy functionalized aromatic amines and oxidized hydroxy functionalized aromatic amines. The expression "hydroxy functionalized" as employed herein is defined as incorporation of a phenolic moiety.

Preferably, the hydroxy functionalized aromatic amines are represented by the following formula:

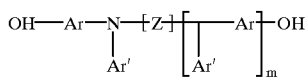

wherein:
m is 0 or 1.
Ar is selected from the group consisting of:

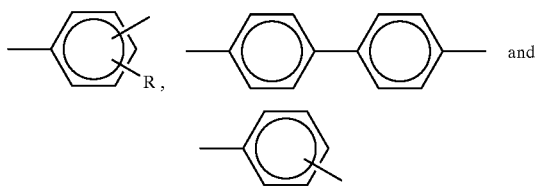

wherein
R is selected from the group consisting of —$CH_3$, —$C_2H_5$, —$C_3H_7$, and —$C_4H_9$, Ar' is selected from the group consisting of:

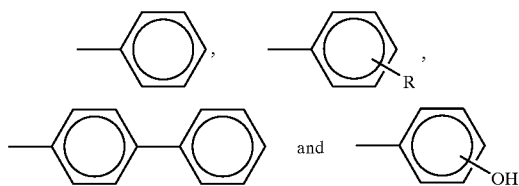

Z is selected from the group consisting of:

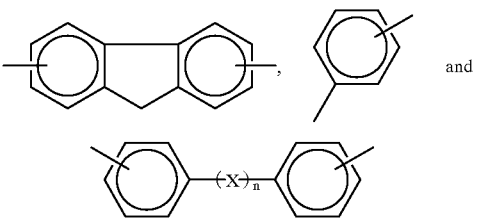

wherein
n is 0 or 1,
X is selected from the group consisting of:

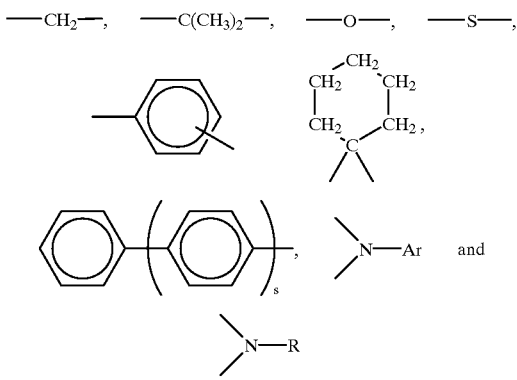

wherein
s is 0, 1 or 2.
This hydroxy arylamine compound is described in detail in U.S. Pat. No. 4,871,634, the entire disclosure thereof being incorporated herein by reference. Typical hydroxy functionalized arylamines include, for example:
N,N'-diphenyl-N,N'-bis(3-hydroxyphenyl)-[1,1'-biphenyl]-4,4'-diamine;
N,N,N',N',-tetra(3-hydroxyphenyl)-[1,1'-biphenyl]-4,4'-diamine;
N,N'-diphenyl-N,N'-bis(3-hydroxyphenyl)-[1,1':4',1"-terphenyl]-4,4"-diamine,
N,N'-diphenyl-N,N'-bis(4-hydroxyphenyl)-[1,1'-biphenyl]-4,4"-diamine,
N,N,N',N',-tetra(4-hydroxyphenyl)-[1,1'-biphenyl]-4,4'-diamine;
N,N-di(3-hydroxyphenyl)-m-toluidine;
1,1-bis-[4(di-N,N-m-hydroxyphenyl)-aminophenyl]-cyclohexane;
1,1-bis[4-(N-m-hydroxyphenyl)-4-(N-phenyl)-aminophenyl]-cyclohexane;
Bis[(N-(3-hydroxyphenyl)-N-phenyl)-4-aminophenyl]-isopropylidene.

A specific preferred hydroxy functionalized aromatic diamine compound is N,N'-diphenyl-N,N'-bis(3- hydroxyphenyl)-[1,1'-biphenyl]-4,4'-diamine(DHTBD) represented by the formula:

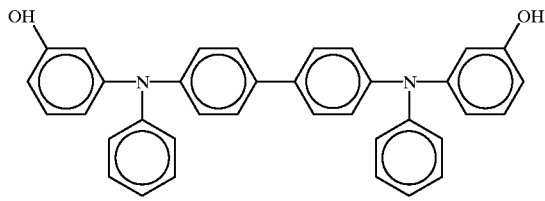

The film forming polyamides and the hydroxy functionalized aromatic amines are also soluble in a solvent to facilitate application by conventional coating techniques. Typical solvents include, for example, butanol, propanol, methanol, butyl acetate, ethanol, cyclohexanone, tetrahydrofuran, methyl ethyl ketone, and the like and mixtures thereof.

The tunable conducting films of this invention must also contain oxidized hydroxy functionalized aromatic amines (the radical cation of hydroxy functionalized aromatic amines) which is a reaction product of the hydroxy functionalized aromatic amine and an oxidizing agent capable of accepting one electron from the hydroxy functionalized aromatic amine and is represented by the formula:

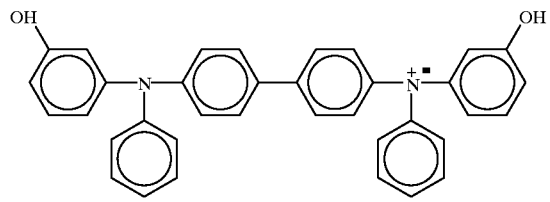

The total concentration of hydroxy functionalized aromatic amines and oxidized hydroxy functionalized aromatic amine in the dried conductive layer can, for example, be between about 10 percent and about 70 percent by weight, based on the total weight of the dried overcoat. Preferably, the total concentration of hydroxy functionalized aromatic amine and oxidized hydroxy functionalized aromatic amine in the conductive layer is between about 30 percent by weight and about 60 percent by weight, based on the total weight of the dried conductive layer, based on the total weight of the combination of hydroxy functionalized aromatic amine, oxidized hydroxy functionalized aromatic amine and the cross linked polyamide in the dried conductive layer. Moreover, the dried conductive coating should contain at least about 2 weight percent oxidized hydroxy functionalized aromatic amine, based on the weight of dried conductive layer, to maintain the layer sufficiently electrically conductive. When less than about 10 percent by weight of the combination of oxidized hydroxy functionalized aromatic amine and hydroxy functionalized triarylamine is present in the overcoat, the charge carrier mobility is very low. When more than about 70 percent by weight of the combination of oxidized hydroxy functionalized aromatic amine and hydroxy functionalized triarylamine is present in the overcoat, phase separation occurs. Optimum conductive performance is achieved when 50 weight percent or less of the hydroxy functionalized aromatic amine is oxidized.

Crosslinking of the polyamide as well as the oxidation of part of, but not all, of the hydroxy functionalized aromatic amines is accomplished by heating in the presence of a sufficient amount of catalyst. Heating also drives off the remaining solvent. Any suitable acid catalyst may be employed. Typical catalysts include, for example, oxalic acid, maleic acid, carbollylic acid, ascorbic acid, malonic acid, succinic acid, tartaric acid, citric acid, p-toluenesulfonic acid, methanesulfonic acid, and the like and mixtures thereof. Catalysts that transform into a gaseous product during the crosslinking reaction are preferred because they escape the coating mixture and leave no residue that might adversely affect the electrical properties of the final coating. A typical catalyst is, for example, oxalic acid which partially forms a gaseous product. The temperature used for cross linking varies with the specific catalyst selected, heating time utilized and the degree of cross linking desired. The amount of catalyst required to achieve both cross linking as well as oxidation of hydroxy functionalized aromatic amine as well as achieving the desired conductivity will vary depending upon the specific polyamide, initial concentration of hydroxy functionalized aromatic amine, temperature and time used for the reaction. A typical cross linking temperature used for Luckamide with oxalic acid as a catalyst is about 125° C. for about 30 minutes. A typical prior art concentration of oxalic acid required for cross linking of Luckamide is between about 5 and about 10 weight percent based on the weight of the Luckamide. After cross linking, the cross linked polyamide is insoluble in the solvent used to apply the coating. In the prior art for photoreceptor overcoating layers employing cross linked polyamide with hydroxy functionalized aromatic amines, the films have to be almost insulating in the dark but transport holes photogenerated in the generator layer and subsequently injected into the transport layer. After the charges transport through the transport layers, they are injected into the overcoat material containing cross linked polyamide with hydroxy functionalized aromatic amines. For optimum behavior as an overcoat material, the charges injected into the overcoat have to be transported through the overcoat. Therefore, for applications as overcoat material, the overcoat material has to be insulating in the dark and yet transport holes photogenerated during the exposure cycle. The acid, in addition to cross linking the Luckamide, must partially oxidize the hydroxy functionalized aromatic amines in order to provide the free charge carriers required to impart conductivity. Thus, in order for films of this invention to be electrically conducting, it is necessary to provide some free carriers in the film by partially oxidizing hydroxy functionalized aromatic amines. To achieve partial oxidation of hydroxy functionalized triarylamine, a much higher acid concentration (greater than 15 percent by weight based on the weight of the cross linkable polyamide) is required. After cross linking, the conducting film should be substantially insoluble in the solvent in which it was soluble prior to crosslinking. Thus, no material will be removed from the film when rubbed with a cloth soaked in the solvent. Cross linking results in the development of a three dimensional network which restrains the hydroxy functionalized triarylamine and the oxidized hydroxy functionalized triarylamine as a fish is caught in a gill net. Conductivity is achieved as a result of electron transfer from a neutral hydroxy functionalized triarylamine to one that has been oxidized by the acid. Thus, it is critically important for conductivity that the final coating contains neutral hydroxy functionalized triarylamine as well as a hydroxy functionalized triarylamine that has been oxidized. Preferably, cross linking of the polyamide is achieved by a cross linking agent such as oxalic acid; the oxidation of oxidized hydroxy functionalized aromatic diamine also being achieved by using oxalic acid in excess of that required to cross link the polyamide. Without being limited by theory, the conductivity of the final coating can be controlled or tuned by varying the concentration of hydroxy functionalized triarylamine and the concentration of the acid to achieve a mix of both neutral hydroxy functionalized triarylamine and oxidized hydroxy functionalized triarylamine, the amount of oxidized hydroxy functionalized triarylamine being present in the dried layer to achieve an electrical conductivity in the layer of at least about $10^{-12}$ S/cm.

In preferred embodiments, the weight percent ratio of the polyamide to hydroxy functionalized aryl amine (prior to oxidation of part of the hydroxy functionalized aryl amine) is of from about 30:70 to about 90:10. The concentration of acid required to cross link the polyamide as well as partially oxidize the hydroxy functionalized aryl amine is from about 15 weight percent to about 100 weight percent, based on the total weight of polyamide.

Any suitable and conventional technique may be utilized to mix and therefore apply the conducting layer coating mixture. Typical application techniques include spraying, dip coating, roll coating, wire wound rod coating and the like. Removal of the solvent from the solvent coated layer may be effected by any suitable conventional technique such as oven drying, infrared radiation drying, air drying and the like. Preferably, curing and drying of the layer is carried out at a temperature of between about 80° C. and 150° C.

In some embodiments of the conductive polymeric compositions of the present invention, the dried coatings can have a conductivity of from about $10^{-12}$ S/cm to about 1 S/cm, the conductivity depending upon the concentration of the aryl amine groups of both the hydroxy functionalized aryl amine and the oxidized hydroxy functionalized aryl amine and the concentration of the acid catalyst selected.

In another embodiment of the present invention a process is provided for the fabrication of conductive polymer coatings comprising:

providing a hydroxy functionalized aryl amine;

admixing the hydroxy functionalized aryl amine with a cross linkable polyamide in a solvent to form a coating solution;

adding an acid to the coating solution;

depositing the coating solution on a substrate to form a coating, and curing the coating to remove the solvent, cross link the polyamide and partially oxidize the hydroxy functionalized aryl amine to form an electrically conductive layer.

In other words the process of this invention can comprise forming an electrically conductive layer on a substrate comprising providing a substrate, providing a coating composition comprising
  a hole transporting hydroxy functionalized aryl amine,
  a cross linkable polyamide,
  an acid and
  a solvent, forming a coating of the coating composition on the substrate, and heating the coating to cross link the polyamide and oxidize sufficient hole transporting hydroxy functionalized aryl amine to form a dried electrically conductive layer comprising
  the hole transporting hydroxy functionalized aryl amine,
  oxidized hydroxy functionalized aryl amine, and
  a crosslinked polyamide matrix.

Any suitable substrate may be utilized. The substrate can, for example, have a thickness of from about 50 microns to about 1,000 microns. A typical dried conductive coating layer has a thickness of from 0.1 to about 5 micrometers. Depending upon the final layer thickness desired, the solids concentration of the coating solution can be, for example, from about 0.1 to about 50 weight percent, based on the total weight of the solution. The coatings can be deposited on the substrate by any suitable technique. Conventional techniques include, for example, spin coating, spray coating, dip coating, flow coating and the like. The conductive coatings may also be employed as thick undercoat layers. They can also be employed as coatings on scavengeless electroded donor rolls, semiconductive intermediate transfer belts, ground planes, anti static films and the like. These conductive coatings may be suitable for special types of photoreceptor overcoatings when the conductivity is at the lower end of the $10^{-12}$ to 1 S/cm range, but are unsuitable for photoreceptor overcoatings at the higher end of that scale because they are too conductive and cause lateral discharge.

The invention will further be illustrated in the following non-limiting examples, it being understood that these examples are intended to be illustrative only and that the invention is not intended to be limited to the materials, conditions, process parameters, and the like, recited herein. Parts and percentages are by weight unless otherwise indicated.

EXAMPLE I

A solution was prepared by dissolving one gram of polyamide (Luckamide 5003, available from Dai Nippon Ink) in 8 grams of methanol and 2 grams of 1,3-dioxolane while stirring at 50° C. When the polyamide was completely dissolved, it was divided into four portions. Various amounts of N,N'-diphenyl-N,N'-bis(3-hydroxyphenyl)-[1,1'-biphenyl]-4,4'-diamine (DHTBD) were added the different portions, followed by various amounts of oxalic acid (see Table 1). Four test coatings were formed on a graphite substrate (Mystar) and dried at 110° C. for 30 minutes to form dried layers (see Table 1). Gold electrode coatings were formed on the dried layers by sputtering. The electrode coatings were dot shaped with a ¼ inch diameter. The electrode coatings were then contacted with an indium padded probe. Since the graphite substrate was expected to be a hole injecting media, the gold electrodes were held at a negative potential (bias) in all measurements (however, most measurements with changing polarity in bias had symmetric or close-to-symmetric I-V (current-voltage) curves. The I-V curve is symmetric if the same current is measured when the voltage source polarity is changed (gold electrode is either positive or negative). The layer thicknesses were capacitively evaluated and found to be in the expected range of 5–6 micrometers. The resistivities of the dried layers are shown in Table 1. The conductivity is the inverse of the resistivity.

TABLE 1

| | Ratio | | | |
|---|---|---|---|---|
| Sample | Luckamide | DHTBD | Oxalic Acid | Resistivity [Ωcm] |
| A | 1.00 | 0.25 | 0.25 | 8.4e11 |
| B | 1.00 | 1.00 | 0.25 | 6.0e9 |
| C | 1.00 | 0.25 | 0.50 | 2.1e6 |
| D | 1.00 | 1.00 | 0.50 | 1.4e8 |

The results in Table 1 demonstrate that the conductivity can be tuned by varying the concentration of DHTBD and oxalic acid. The resistivity of a layer prepared with Luckamide:DHTBD:oxalic acid in the ratio 1:1:<0.1 is larger than $10^{13}$ ohm cm. Since resistivity (the inverse of conductivity) has ohm-cm units, all of the resistivity values in the last column fall within the 1 to $10^{-12}$ $(ohm-cm)^{-1}$ range.

Although the invention has been described with reference to specific preferred embodiments, it is not intended to be limited thereto, rather those having ordinary skill in the art will recognize that variations and modifications may be made therein which are within the spirit of the invention and within the scope of the claims.

What is claimed is:

1. An electrically conductive composition comprising a mixture of a reaction product of
   a hole transporting hydroxy functionalized aryl amine,
   a cross linkable polyamide, and
   and an acid capable of simultaneously cross linking the polyamide and oxidizing a portion of the hydroxy functionalized arylamine,
said mixture of a reaction product comprising
   a hole transporting hydroxy functionalized aryl amine and
   an oxidized hydroxy functionalized aryl amine in a
   a crosslinked polyamide matrix.

2. An electrically conductive composition according to claim 1 wherein said polyamide is crosslinked in the presence of an acid catalyst.

3. An electrically conductive composition according to claim 1 wherein said polyamide contains amide nitrogen atoms and said amide nitrogen atoms contain methoxy methyl groups prior to crosslinking.

4. An electrically conductive composition according to claim 1 wherein said crosslinked polyamide prior to cross linking being selected from the group consisting of materials represented by the following Formulae I and II:

I

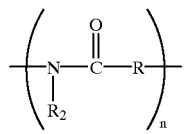

wherein:
   n is a positive integer sufficient to achieve a weight average molecular weight between about 5000 and about 100,000,
   R is independently selected from the group consisting of alkylene, arylene or alkarylene units having from 1 to 10 carbon atoms,
   between 1 and 99 percent of the $R_2$ sites are —H, and
   the remainder of the $R_2$ sites are —$CH_2$—O—$CH_3$ and

II

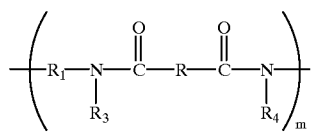

wherein,
   m is a positive integer sufficient to achieve a weight average molecular weight between about 5000 and about 100,000,
   $R_1$ and R are independently selected from the group consisting of alkylene, arylene or alkarylene units having from 1 to 10 carbon atoms,
   between 1 and 99 percent of the $R_3$ and $R_4$ sites are —H, and
   the remainder of the $R_3$ and $R_4$ sites are —$CH_2$—O—$CH_3$.

5. An electrically conductive composition according to claim 4 wherein the polyamide is represented by the formula:

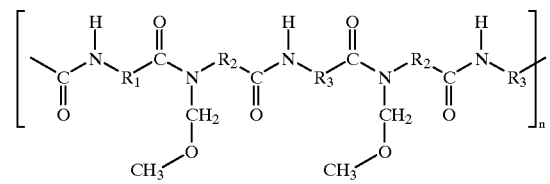

wherein
   $R_1$, $R_2$ and $R_3$ are alkylene groups independently selected from units containing from 1 to 10 carbon atoms and
   n is a positive integer sufficient to achieve a weight average molecular weight between about 5000 and about 100,000.

6. An electrically conductive composition according to claim 1 wherein said hydroxy functionalized aromatic amine is represented by the following formula:

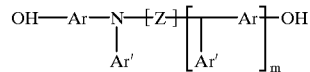

wherein:
   m is 0 or 1,
   Ar is selected from the group consisting of:

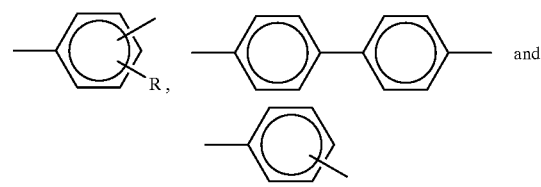

wherein
   R is selected from the group consisting of —$CH_3$, —$C_2H_5$, —$C_3H_7$, and —$C_4H_9$,
   Ar' is selected from the group consisting of:

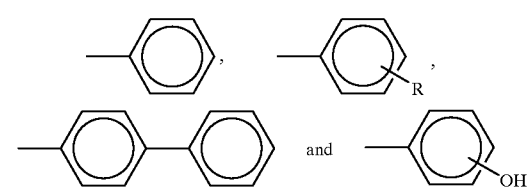

Z is selected from the group consisting of:

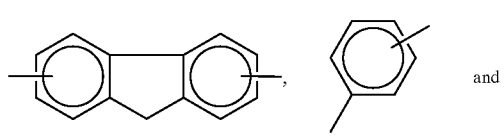

-continued

[chemical structure: two phenyl rings connected by (X)ₙ]

wherein
n is 0 or 1,
X is selected from the group consisting of:

—CH₂—, —C(CH₃)₂—, —O—, —S—,

[chemical structures showing cyclohexylidene-type, biphenyl linkage, and N—Ar, N—R groups]

wherein
s is 0, 1 or 2.

7. An electrically conductive composition according to claim 1 where in said hydroxy functionalized aromatic amine is partially oxidized by an acid.

8. An electrically conductive composition according to claim 2 wherein said polyamide is crosslinked in the presence of an oxalic acid catalyst.

9. An electrically conductive composition according to claim 1 wherein said mixture of a reaction product comprises between about 10 percent and about 70 percent by weight of the combination of said hydroxy functionalized aromatic amine and said oxidized hydroxy functionalized aromatic amine, based on the weight of said mixture of a reaction product and said mixture of a reaction product comprises at least about 2 percent by weight of said oxidized hydroxy functionalized aromatic amine, based on the weight of said mixture of a reaction product.

10. An electrically conductive composition according to claim 6 wherein said hydroxy functionalized aromatic amine is N,N'-diphenyl-N,N'-bis(3-hydroxyphenyl)-[1,1'-biphenyl]-4,4'-diamine and represented by the formula:

[chemical structure of N,N'-diphenyl-N,N'-bis(3-hydroxyphenyl)-[1,1'-biphenyl]-4,4'-diamine with OH groups]

11. A process for forming an electrically conductive layer on a substrate comprising
providing a substrate,
providing a coating composition comprising
a hole transporting hydroxy functionalized aryl amine,
a cross linkable polyamide,
an acid and
a solvent
forming a coating of the coating composition on the substrate, and heating the coating to cross link the polyamide and oxidize sufficient hole transporting hydroxy functionalized aryl amine to form a dried electrically conductive layer comprising
the hole transporting hydroxy functionalized aryl amine,
oxidized hydroxy functionalized aryl amine, and
a crosslinked polyamide matrix.

12. A process according to claim 11 wherein the crosslinked polyamide prior to cross linking being selected from the group consisting of materials represented by the following Formulae I and II:

[chemical structure Formula I: polyamide repeat unit with N(R₂)—C(=O)—R]

wherein:
n is a positive integer sufficient to achieve a weight average molecular weight between about 5000 and about 100,000,
R is independently selected from the group consisting of alkylene, arylene or alkarylene units having from 1 to 10 carbon atoms,
between 1 and 99 percent of the R₂ sites are —H, and
the remainder of the R₂ sites are —CH₂—O—CH₃ and

[chemical structure Formula II: polyamide repeat unit with R₁—N(R₃)—C(=O)—R—C(=O)—N(R₄)]

wherein,
m is a positive integer sufficient to achieve a weight average molecular weight between about 5000 and about 100,000,
R₁ and R are independently selected from the group consisting of alkylene, arylene or alkarylene units having from 1 to 10 carbon atoms,
between 1 and 99 percent of the R₃ and R₄ sites are —H, and
the remainder of the R₃ and R₄ sites are —CH₂—O—CH₃.

13. A process according to claim 12 wherein the polyamide is represented by the formula:

[chemical structure showing polyamide with R₁, R₂, R₃ groups and CH₂—O—CH₃ side chains]

wherein
R₁, R₂ and R₃ are alkylene groups independently selected from units containing from 1 to 10 carbon atoms and
n is a positive integer sufficient to achieve a weight average molecular weight between about 5000 and about 100,000.

14. A process according to claim 11 wherein the hydroxy functionalized aromatic amine is represented by the following formula:

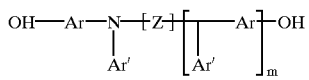

wherein:

m is 0 or 1,

Ar is selected from the group consisting of:

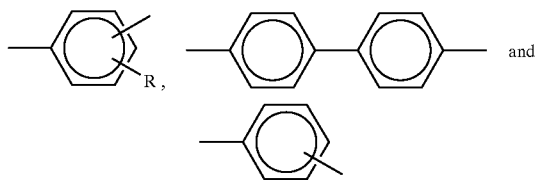

wherein

R is selected from the group consisting of —CH₃, —C₂H₅, —C₃H₇, and —C₄H₉,

Ar' is selected from the group consisting of:

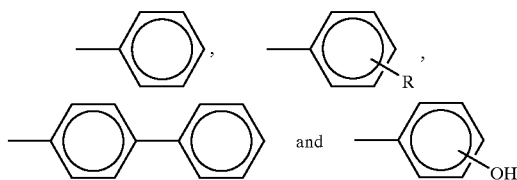

Z is selected from the group consisting of:

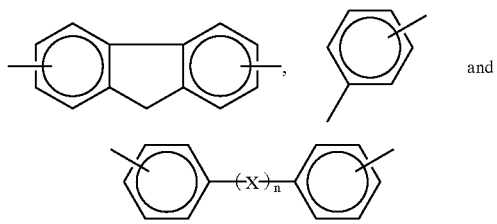

wherein n is 0 or 1,

X is selected from the group consisting of:

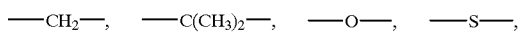

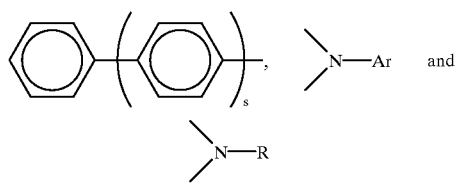

wherein s is 0, 1 or 2.

15. A process according to claim 11 wherein the hydroxy functionalized aromatic amine is partially oxidized by the acid.

16. A process according to claim 11 wherein the polyamide is crosslinked in the presence of the acid and the acid is an oxalic acid catalyst.

17. A process according to claim 16 wherein the hydroxy functionalized aromatic amine is partially oxidized by the oxalic acid.

18. A process according to claim 11 wherein the hydroxy functionalized aromatic amine is N,N'-diphenyl-N,N'-bis(3-hydroxyphenyl)-[1,1'-biphenyl]-4,4'-diamine and represented by the formula:

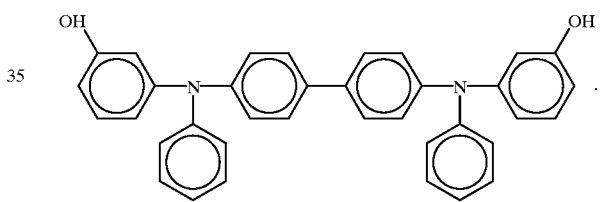

19. A process according to claim 11 wherein the dried electrically conductive layer has a conductivity of between about 1 S/cm and about $10^{-12}$ S/cm.

20. A process according to claim 11 wherein the weight percent ratio of the polyamide to hydroxy functionalized aryl amine prior to oxidation of part of the hydroxy functionalized aryl amine is from about 30:70 to about 90:10 and the concentration of acid is from about 15 weight percent to about 100 weight percent, based on the total weight of polyamide.

* * * * *